COMMUNICATION SWITCHING SYSTEMS

Filed Dec. 3, 1959 5 Sheets-Sheet 1

INVENTOR.

Philo Holcomb Jr

COMMUNICATION SWITCHING SYSTEMS

Filed Dec. 3, 1959 5 Sheets-Sheet 2

INVENTOR.

Philo Holcomb Jr

COMMUNICATION SWITCHING SYSTEMS

Filed Dec. 3, 1959 5 Sheets-Sheet 3

INVENTOR.

Philo Holcomb Jr

INVENTOR.

Philo Holcomb Jr

INVENTOR.

Philo Holcomb Jr

United States Patent Office 3,071,641
Patented Jan. 1, 1963

3,071,641
COMMUNICATION SWITCHING SYSTEMS
Philo Holcomb, Jr., Great Neck, N.Y., assignor, by mesne assignments, to Litton Systems, Inc., Beverly Hills, Calif., a corporation of Maryland
Filed Dec. 3, 1959, Ser. No. 857,131
11 Claims. (Cl. 178—4)

This invention relates to systems and apparatus for interconnecting communication equipment, for the purpose of transmitting intelligence from one point to another. While a multistation printing telegraph system will be described for the purpose of explaining the invention, obviously it is applicable to the selective transmission of voice, facsimile signals, computer data and other intelligence.

The object of the invention, in general terms, is to provide an improved and more reliable system for interconnecting a transmitter with a wanted line or receiving apparatus.

Another object of the invention is to increase the speed and efficiency of switching systems of the character described.

Another object of the invention is to simplify the control apparatus required, to eliminate certain auxiliary devices such as the answer-back cam on the receiver, and provide greater ease of operation for the customer simplifying the operating technique.

Another object of the invention is to provide in a message handling system, improved means for automatically incorporating in each message certain data, such as a prefix, which may be used in tracing messages and for other purposes.

These and other features of the invention are explained in the paper No. CP 58–1143 entitled, "A Character-metered Transatlantic Switching System," presented at the joint national symposium of American Institute of Elec. Engineers and Institute of Radio Engineers in December 1958, by I. S. Coggeshall and the applicant.

Other objects and advantages of the invention will appear from the following description of the preferred embodiments thereof shown in the accompanying drawings, wherein FIGS. 1, 2 and 3, taken together, form a circuit diagram of the switching and control equipment at the sending end of the system (the corresponding equipment at the receiving end is practically identical as will be explained);

In accordance with the invention, a novel system is provided for selectively connecting a calling or originating station to a wanted station for the transmission of messages, facsmile signals or general data of any character that is to be transmitted between two spaced points. In the general the system may employ conventional switchgear either manual or automatic, such as stepping switches or crossbar switches. The invention relates to novel controls and control apparatus for such switchgear, and for effecting other concurrent or related functions useful in the operation of a system of this kind. It is assumed that the traffic is divided up into units of messages in some cases and in other cases the traffic is continuous. All modifications described are suitable for broken up (or unit) traffic. A system suitable for the transmission of intelligence in a form which is either continuous or broken up will first be described.

Figure 1:
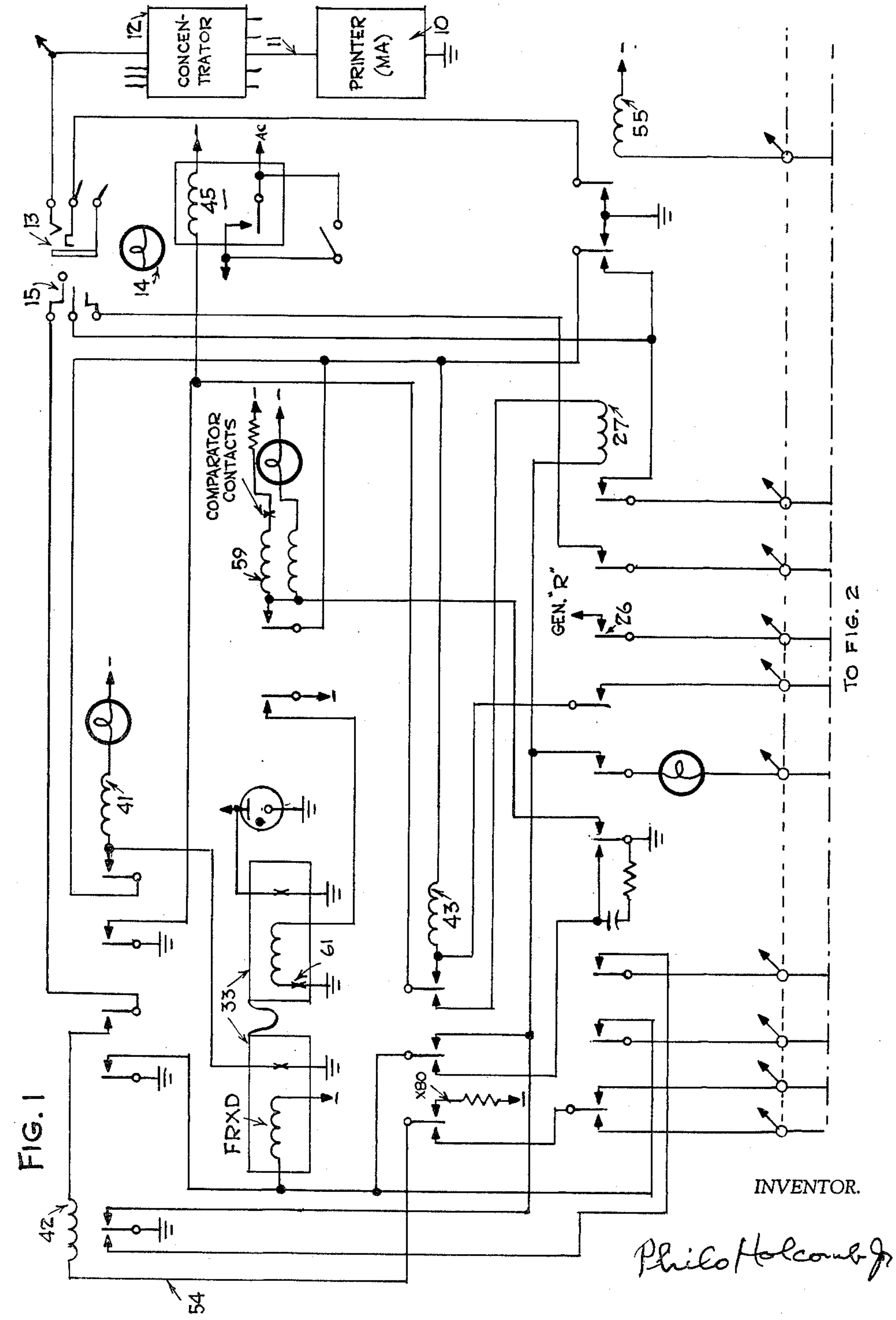
Figure 2:
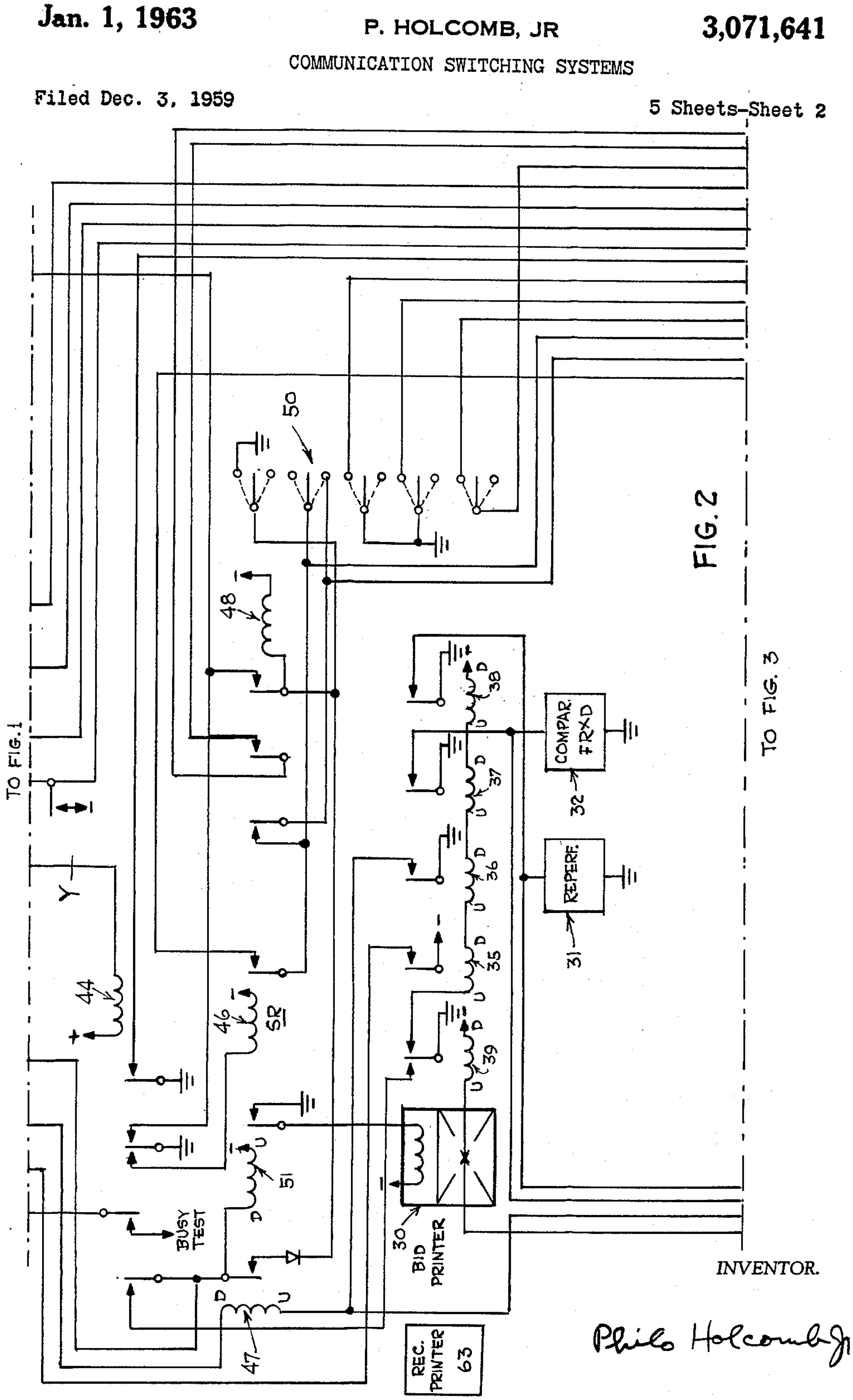
Figure 3:
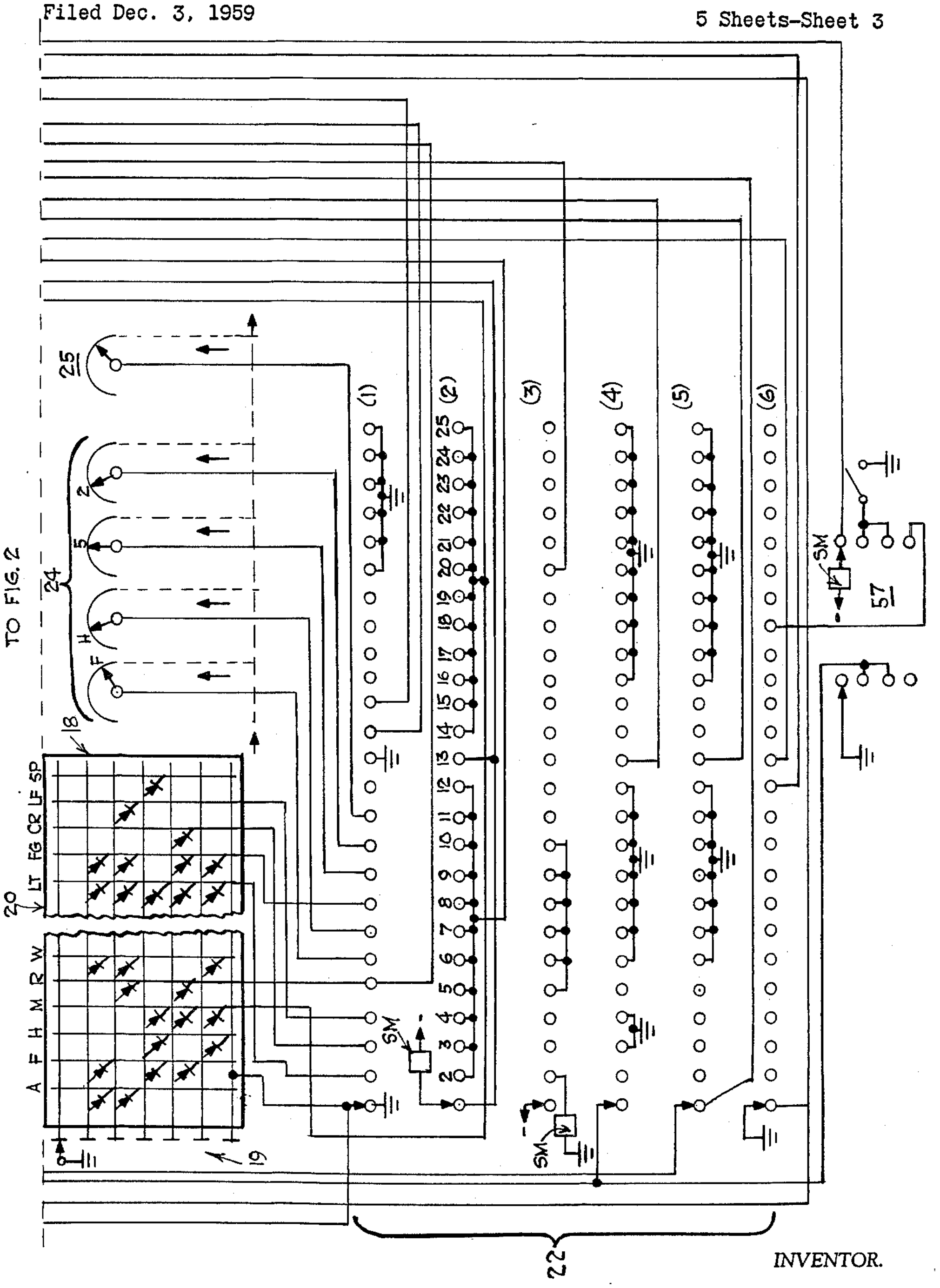

Referring to FIGS. 1–3, a printing telegraph system is shown for connecting an originating call or customer's tie line to a transmitting channel through a manual switchboard comprising plugs and jacks. It is assumed that the system comprises a remote switching office embodying a system and switching apparatus similar to that shown in FIGS. 1–3, as will be explained. It is obvious that automatic switching may be employed since the control features of the present invention are independent of the type of switching used. The system shown for purpose of illustration further includes a concentration unit for connecting calling customers to a central switching position at the originating office. The channels or trunks between the originating and final offices may be varioplex channels, multiplex channels, or a multiplicity of carrier channels of the conventional type well known in the art. The use of varioplex channels is preferred for the traffic trunks and for the bid channel because with the varioplex, improved line efficiency is obtainable. One type of varioplex system that may be used is shown in U.S. Patent No. 2,313,238 granted to the present applicant. Similarly, suitable multiplex and carrier systems are well known in the art and a detailed description of this part of the system is, therefore, omitted for the sake of simplicity. Any suitable means of concentrating the customer circuits for switching to the trunks may be employed and the present disclosure is based on the so-called "Plan 2" telegraph concentrator of Drake and Blanton which is described in U.S. Patent No. 1,804,327. The "Plan 2" concentrator has the advantage that it incorporates a busy-line test circuit and means for shutting down the out station printer when the tieline is opened or unplugged at the central office. With a system such as the one described hereinafter, it is desirable to avoid the usual time delay cut-off that is commonly used today in printing telegraph systems.

The direct one-way system to be described first can be readily understood from the following outline: A customer having the designation MA has something to send and pushes his button. This brings up a light on the switchboard at the switching office. The operator there selects an idle sending cord and plugs it into the jack under the light. A message prefix of a very special kind is automatically transmitted to the sender's printer, into the message that is going to be sent, and also into the supervisory printer at the switching office, and selected portions of this prefix forming a control code signal are stored at the calling office and also transmitted to the called office termination point of the system over a special channel known as the "bid" channel. This control code prints in front of the remote operator at the called office and incorporates full information necessary for the completion of the call at that point. In the meantime, customer MA immediately follows the prefix with a message and eventually concludes the message with a termination signal, such as—"figures J"—(bell). This message is partially or temporarily stored at the calling switching office.

Before the customer MA concludes his message, it is very likely that the call will be completely switched to the wanted printer or selected tie-line at the called office. When that switching takes place an automatic confirmation or checking code signal is sent back to the calling office which letter by letter is compared with the bid or control code that was stored there. If the codes match properly, it is certain that the bid or control code is not errored on the line to and from the called office, and that the switching instructions were carried through accurately. If the checking code matches the bid at the calling office, as much of MA's transmission as has been stored there is automatically released and flows through the trunk directly into the called customer's tie-line. When the terminating signal (bell) is received at the first switching office or originating office, a lamp is lit at the cord and the operator disconnects. When this terminating signal reaches the called office, it operates a similar signal at the cord there and the called operator disconnects and restores the system to normal. The channel between the calling and called switching offices is then available for another call.

In a preferred form of the present invention, it has been found possible to use rack equipment that is almost identical for the sending and receiving cords. A simple program switch associated with the master set performs the intricate operation for putting through the calls.

Referring to FIG. 1, 10 is the MA customer's installation or printer on tie-line 11 leading to the concentrator 12. 13 is the MA jack in the concentrator. 14 is a light above the jack that is turned on when the MA customer actuates a pushbutton opening his line, as described in the Drake and Blanton patent above referred to. The plug 15 is associated with the out-bound trunk. There are shown various relays and pieces of apparatus associated with plug 15, and common equipment that is temporarily associated with every call that is being set up.

An important part of the common equipment is the character generator 18, FIG. 3, which here has the form of common sequencing from a distributor 19 and a diode grid 20, as described in U.S. Patent No. 2,291,964, granted to applicant. In this character generator, codes representing all the letters of the alphabet are made available for miscellaneous use by the means shown. A large number of codes are available and for convenience are identified by their printing code or "letter."

The character generator 18 supplies characters in 7 or 7½ unit code or other sequential form wherever they are required. One use for such characters is on the program switch 22. Another use is on the calendar clock unit 24; another use, on the message sequence unit 25; another use is to designate the cord that answered the call. (For example, contact 26 of connect relay 27 is connected to "R" of the character generator.) Another use for the output of the character generator 18 is for the designation of individual jacks in the jack field by their coordinate positions.

Figure 4:
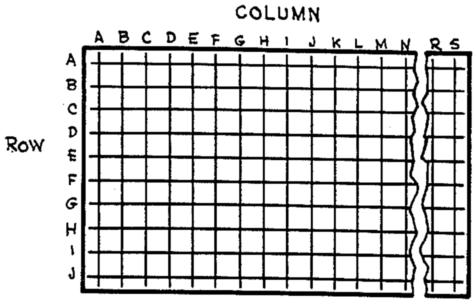
FIG. 4 is a diagram representing the jack-field in the concentrator.

It is a feature of the present invention that the ring springs of all the jacks in a horizontal row be multipled and connected to the letter in the character generator designating that row, and that all of the sleeves in a certain vertical column of the jack field be multipled and connected to the letter designating that column (see FIG. 4). It is obvious that with an ordinary three-conductor plug, and a jack which brings its coordinate location to the plug by code letters always associated with the jack, information can be made available to the plug which is of individual character. It is common practice today for customers to identify themselves by an "'answer-back cam," something which the present invention eliminates in a simple effective manner.

Other portions of the common equipment section of the set are the bid printer, 30, the bid channel reperforator, 31 (not needed on a bid channel capable of carrying teleprinter signals) and comparator FRXD 32 in the form of a reperforator-transmitter in which the bids are stored until they are confirmed by their proper execution at the distant terminal. The unit 33 in the cord equipment section of the set, comprises a similar or the equivalent reperforator-transmitter, in which out-bound messages are to be stored. The various relays in the common equipment and the cord equipment will be described by function.

As illustrated in FIG. 3, the calendar-clock unit 24 reads FH52. F. represents the day of the week, Friday; H, the hour of the day. If 1:00 a.m. is A, H being the eighth letter would be 8:00 a.m. 52 represents the minutes after the hour, H. Although the calendar-clock unit may be constructed in various ways, a simple one may be constructed with four ordinary stepping switches. One switch would be stepped once every minute from an outside source and after each revolution, the 10-minute switch would step. The hour switch would step after 6 steps of the 10-minute switch and the day switch would step once for each revolution of the hour switch. If a timing unit like this is once set to a standard time, for example, it will never have to be set again, provided the outside source does not fail. The message sequence switch 25 steps once for every transit of the program switch. There are 10 points on the sequence switch.

The common equipment section of the set has four transmitter relays 35—38 of the polar type as indicated by their UD coil markings. These four relays are operated by the tongue of the signal generator relay 39, the coil of which is operated either by the keyboard or by the rotor of the program switch passing over points of the first level. The signals originate from the character generator 18, sequenced by distributor 19. A uniform combination is sent by the program switch to all four transmitter relays but other levels of the program switch ground the marking contacts of the transmitter relays 35 to 38 at such times that the output of each transmitter relay takes a pattern that is suitable for its own use. The operator does not have to remember the stage of bidding he is in because all this is done by the selective blinding of the marking contacts of the transmitter relays.

Thus, if no calls are being placed at all, the operator at the calling end can send and receive over his bid channel to and from his counter-part in the terminating switching center. As soon as a plug, for example, idle channel plug R, is used to answer a call, for example one from "MA," bid printer 30 becomes associated with MA printer 10 and can send to and receive from it on a single-line basis. If no such conversation takes place, however, and it normally would not, although the slow release relay 46 allots time for it to be initiated, the program switch 22 begins to step and send code combinations to the MA printer 10, the bid printer 30, the bid channel reperforator 31, the comparator 32, and FRXD 33. As stated before, the combinations are tailored to suit each of the five places they go to. After the program switch 22 has completed its circuit, the bid printer 31 is reconnected to the bid channel for conversation to the distant operator. On the calendar-clock unit 24, the minute section steps at the end of the time pulse. There is a contact on this unit which closes when the magnet is operated. If battery is applied to this contact, the magnet would not release until the battery were removed and the time would not change. On the third level of the program switch 22, several points that are wired together form a potential locking circuit for the minute switch if the time should happen to change while the program switch was trying to send it out. This feature is known as a Time-Lock. When plug 15 is put into jack 13 in response to the signal, ground from customer's station 10 is applied through the tie-line and passed through the tip of the plug, the third left-hand contacts of disconnect relay 41, tie-line relay 42, the outer left-hand contacts of operate relay 43 and connect relay 27, set-up relay 44, to the vacuum tube set of the Plan 2 concentrator unit which tests for a busy line as described in the above-mentioned Drake and Blanton patent. Since this line is not busy, the vacuum tube sensing is replaced by negative which through the circuit just described, operates tie-line relay 42. Current then flows from ground through the marking contact of tie-line relay 42 through the coil of connect relay 27, thence through the back contact of operate relay 43, through coils of monitor table power relay 45 to negative battery. The operation of the connect relay 27 removes the busy test and connects the customer's transmitting relay to the customer. The operation of set-up relay 44 removes battery from the coil of the slow relase relay 46. After a short period, for example, 2 seconds, the slow release relay 46 will close a circuit which will begin the stepping of the program switch 22. If, however, the switching operator or the customer at MA should interrupt the silent period by conversation or keyboard manipulation of any kind, current would flow through the spacing contact of tie-line relay 42, through connect relay 27, through the marking contact of talk freeze relay 47, through the coil of break relay 48 to operate and lockup the break relay. To start the program switch 22 after preliminary conversation, the operator would have to depress momentarily his cross bid key 50.

The program switch would step until it arrived at point 13 and then stop for a possible insertion of a cross bid by the operator on the keyboard of printer 30. If this cross bid were not made at this time, the switch would be again started by the depression of the cross bid key 50 and the bid would then be completed. If, when the switch stopped at point 13, the customer wished to speak to the switching operator or vice versa, the operator would throw the cross bid key up and converse. Afterwards, he would throw the cross bid key to the lower non-locking point to re-start the switch and complete the bid. FRXD transmitter 33 would not record any conversation between the operator and the customer but it would record the combination sent from the program switch through the FRXD relay 36. When the program switch rotor reaches point 20, negative passes through that point, on the third level, through the coil of the operator relay 43, through the ring of the plug, through the ring of the jack and thence to ground. The operation of operate relay 43 supplies battery through the tie-line relay 42 to the customer for his transmission, and releases connect relay 27. At this point, the customer MA is sending through tie-line relay 42 to FRXD 33, the power relay 45 is operated and applies power to the FRXD transmitter. The program switch 22 is home, and the printer relay 51, talk freeze relay 47, break relay 48 and set-up relay 44 are inoperative. At the end of the message, customer 10 sends a "bell" signal, FIGURES J, and this operates the bell contact of the FRXD 33 which closes a circuit through the coil of disconnect relay 41, lighting "disconnect" light 52 by the cord associated with plug 15. When convenient, the operator unplugs the cord, the Plan 2 concentrator unit shuts down the printer at the out-station 10, the power is shut off at the FRXD by the deenergization of power relay 45. The operate relay 43 is deenergized and the conditions of an idle cord are again resumed. The Plan 2 concentrator for example, as described in the above-mentioned Drake and Blanton patent, will permit the customer to signal for his next message as soon as he has "knocked down." It is not necessary for the switching operator to unplug first, as described above.

At this time, it should be noted that when a cord is first plugged into a jack, the tie-line relay coil circuit 54 of that cord receives battery only through the busy test contact of set-up relay 44. If this contact is open during the placing of a call on one cord, the busy test is not available for any other cord. Advantage is taken of that fact by an operation known as "dove-tail bidding," that is, the switching operator may plug a succeeding call while the current call is in the works. When this is done the program switch 22 spins continuously like a motor armature until all the calls are taken care of. Dove-tail bidding eliminates the usual wait between the end of one call and the beginning of the next and often saves as much as 30% of the operator's time during the peak period.

Another aspect of the invention is incorporation of relay 55 called the "shake" relay. This is a multi-contact relay having one transfer contact associated with each cord and a normally closed contact associated with each column of jacks. The function of this relay, which operates in the system shown in unison with the set-up relay 44, is to provide a solid ground at all times for disconnect relay 41. It is obvious that the rings of the jacks have two functions. When the program switch is not rotating, a solid ground is supplied from jack to plug so that the disconnect relay 41 will fall as soon as or shortly after the cord is unplugged. However, during the transit of the program switch 22, the "shake" relay 55 protects the disconnect relay 41 and permits the teleprinter letter associated with the column of jacks on the board to flow into the plug just put up. Additional contacts on the "shake" relay would permit similar manipulations with the sleeve of the jack even to the extent of utilizing the output of other levels of the program switch or the levels of additional program switches, to give complex information such as the full name of the office "from," the class of the message, customer sequence numbering, full standard time and date or anything else desired from certain jacks in the field, to which that information was applicable. For example, one jack connected to Fort Wayne could put into the prefix the name of that city. The Detroit jack could have "Detroit" wired to its program switch level and it would appear in the prefix of any message on any cord that was plugged into that jack. Thus the "shake" relay 55 greatly multiplies the usefulness of the standard three-wire plug and jack system.

The program switch may be wired with any combination desired, and a prefix that identifies the customer on every message regardless of the cord that is plugged to that customer has great usefulness. The prefix that is wired to the program switch 22 shown starts with LETTERS CARRIAGE RETURN LINE FEED to reset the customer's machine and to put a reset combination at the beginning of the prefix that is stored in the FRXD transmitter 33. The letter "R" is then inserted in the prefix through a contact of connect relay 27. FH52 is the day of the week, hour of the day and minutes after the hour, and 6 is the sequence of the sending plug up. The next plug up on any cord will be 7. The ground is the possible resting place if the customer has interrupted the silent period, but, if he has not done so, the switch continues. In this case, the customer's call is "MA" and these letters follow the potential stopping point. They are repeated for safety on the succeeding two points of the program switch. Finally, CARRIAGE RETURN and LINE FEED is put in to separate the prefix from the text, whereupon the common equipment is then automatically disconnected from the cord equipment and becomes available for the next call. The full combination is wired to the first level of the program switch 22 and is sent to the customer 10, the bid printer 30, and FRXD 33. However, parts of the full combination are blinded out by grounds from the program switch to the comparator and bid channel transmitter relays. Only the combination "LETTERS RMA" is permitted to pass from the comparator relay 37 to the comparator FRXD 32. The bid channel reperforator is permitted to receive only "LETTERS CARRIAGE RETURN LINE FEED RMA." By thus skeletonizing the bid and preparing for an equally brief confirmation from the opposite terminal, the bid channel is very lightly loaded and never becomes a bottleneck of the system. A low speed multiplex or simple varioplex channel such as the one described in U.S. Patent No. 2,176,901 to Holcomb and Boggs would be suitable for bid purposes.

"Crossbidding" on this system occurs when a tie-line wants to be connected to a distant tie-line other than the usual one. Crossbidding could be done by the tie-line operators themselves but it is faster and better to have the tie-line operator express his wish and let the central station operator execute it.

In the system shown, a crossbid is placed in the following manner:

After the plugup the outstation would quickly give the crossbid, for example "PD." The switching operator would start his program switch by depressing the crossbid key. Because of the preliminary conversation the program switch would stop on its 13th point. The switching operator would insert "PDPD space" and depress the crossbid key again. The program switch would then complete the prefix. On the bid and tie-line printers and in the FRXD the prefix would record LETTERS CARRIAGE RETURN LINE FEED RFH526PdPd MAMA CARRIAGE RETURN LINE FEED. The bid channel would carry LETTERS CARRIAGE RETURN LINE FEED RPD SPACE MA and the comparator FRXD would store LETTERS RPD. The operator at station B would note the switching order brought in by his receiving bid printer and plug receiving cord R into the PD jack. This would cause the confirmation or checking code FIGURES (RPD) LETTERS to be sent back to the sending station on the bid channel. At that place it would be diverted by the apostrophe into a comparison operation with what was stored in the comparator FRXD. If cord, customer, and sequence of the bid were all correct, the crossbid would be released. Except for the manual insert of the crossbid, an operation too precise to be entrusted to tie-line operators, crossbidding is as safe and easy as ordinary bidding.

Figure 5:
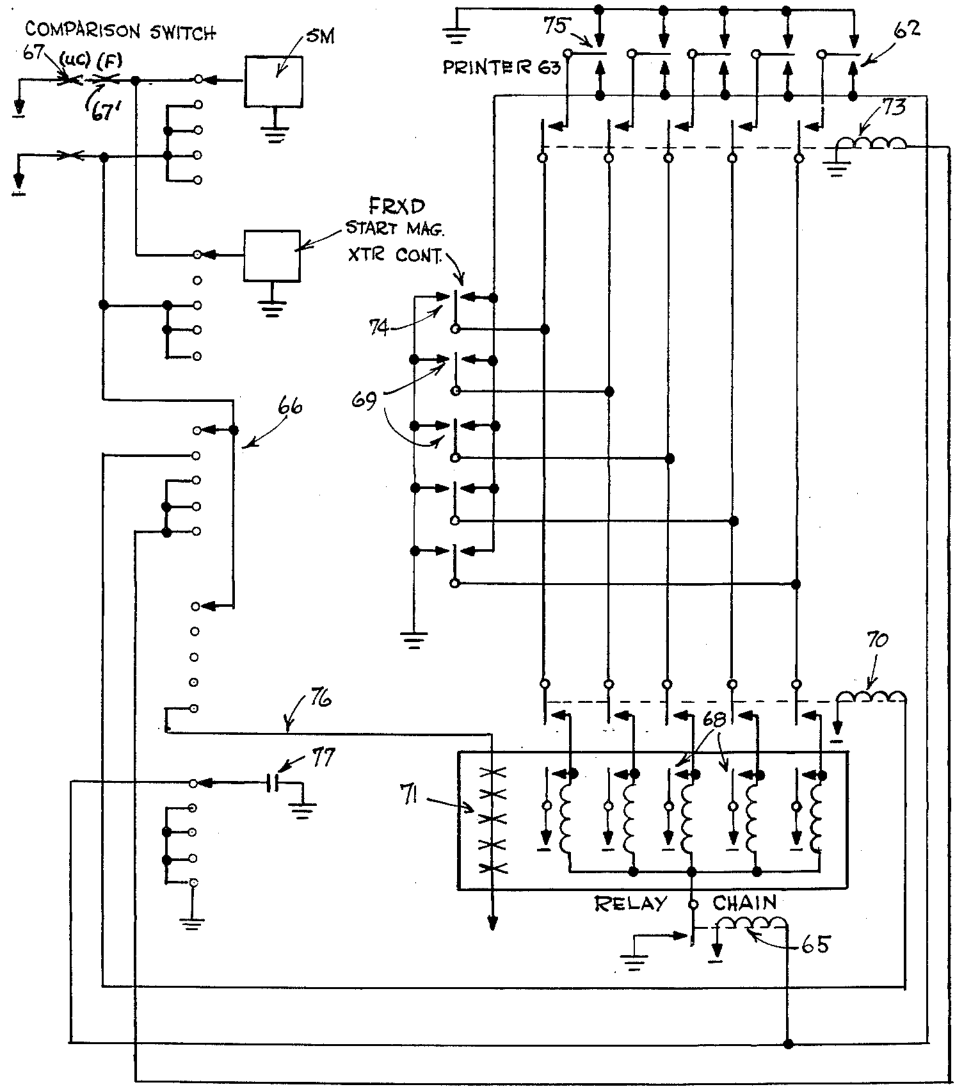
FIG. 5 is detailed circuit diagram of the code comparator shown in FIGS. 1 and 2.

The code comparator arrangement is indicated in FIG. 1 by the X symbol labelled "comparator contacts," and is shown in detail in FIG. 5. The operation is as follows:

It is obvious that when the program switch 22 stops on point 13, the comparator and bid channel relays follow the signals from the keyboard. This is not important on the bid channel provided the distant terminal understands the bid, but it is desirable that all comparisons be uniform and that all bids be put into the comparator FRXD 32 in a uniform manner. Therefore, a comparator limiter 57 is required, which consists of a rotary switch stepped by the program switch 22 and by a contact on the comparator FRXD receiving unit 32. A contact of the break relay 48 is connected between point 12 of the sixth level of the program switch and the home point of the comparator limiter switch 57. In the normal rotation of the program switch, the comparator limiter is inoperative. However, when a break locks up the break relay 48, the program switch 22 will stop on point 13 for the possible introduction of a cross-bid or other remarks. If it does so the comparator limiter switch 57 will permit two operations of the comparator FRXD 32 and then blind the comparator relay 37. After the operator restarts the program switch 22 by pressing the cross-bid key 50, the comparator limiter 57 is brought home by a pulse from point 17 of the level. This unique feature permits the operator to follow his cross-bid with any remarks that he wishes to include in the message. He may even cancel the message by keyboarding BUST FIGURES J LETTERS when the program switch stops on point 13. At the other terminal, the operator would plug the designated cord into jack BU and the confirmation for example-RBU-would make the proper comparison and the spoiled or defective message would pass through the circuit into a spillover jack at terminal B (final office). If the home operator wished to send some remarks to the distant tributary or tie-line printer, he could do so at this point on the program switch, taking care to insert the proper call letters for the message before he began his remarks. Rush or urgent messages could be so designated by the operator at this time and not only would the delivered message bear the urgent designation but the swiching operator at the distance terminal would be plainly advised of the urgency also.

When an outgoing call is answered, a contact of the connect relay 27 permits current to flow to the release relay 59 which then locks up. The contact of the release relay 59 locks up the transmitter portion of the FRXD 33. When the distant end responds to a bid that he receives by sending the proper confirmation, comparator contacts pass a current through a differential coil of the release relay 59 and deenergizes it. The transmitter of FRXD 33 then commences to send until stopped by its tight-tape contact 61 FIG. 5 shows the contacts of the receiving printer designated as 63 on FIG. 1. The confirmation of the bid as received on receiving printer 63 has the following composition: FIGURES F LETTERS RMA; in which the upper case of the letter F is the signal that switches on the comparator unit, R the cord letter, and MA the customer call. The comparator unit associates the FRXD comparator contacts with contacts on the code bars of receiving printer 63. This comparison is effected by momentary direct connections of the swinger contacts of the FRXD 33 with the swinger contacts of the code bars of receiving printer 63. Whenever spacing operations are compared with spacing operations or marking operations with marking operations, there is no connection between the common bus bars. When there is a failure to compare, however, current flows momentarily and operates the non-compare relay 65 (FIG. 5). The stepping magnet of the rotary switch 66 in the comparing unit, homes on the first point (as shown) between comparisons. When the upper case contact 67, of the receiving printer is closed and its F contact momentarily closed by the printing of that letter, the rotor of the rotary switch 66, steps to the second point and continues for four more points, in unison with operation of the bail on the receiving printer 63. The pins of the transmitter of the comparator FRXD 33 are on LETTERS but are immediately moved to the cord letter punched in the tape by the upper case F pulse from receiving printer 63. At this time, the rotary switch is on its second point, and via the third level, the five tree-chain relay contacts 68 align themselves with the setting of the FRXD contacts 69, as a result of the momentary operation of relay 70. Each chain relay has a locking contact as shown and additional contacts not shown in detail, but which are connected to form a baffle circuit 71. Details of such a chain are described in Holcomb U.S. Patent No. 2,343,297. The chain relays that are operated lock themselves in through the back contact ground on relay 65. The purpose of the chain is two-fold. First it remembers the cord letter and second constructs a closed circuit through the fourth level and bail contact to battery that will eventually knock down release relay 59; and start the transmitter of FRXD 33. When the wiper of level 2 reaches the third point, it causes the FRXD transmitter start magnet to operate in synchronism with the signals coming in on the receiving bid printer 63. On the third point of level 3, the pulse through the bail contact of the receiving bid printer cyclically operates comparison relay 73. Any irregularities or differences in the phase between the contact operation on the receiving bid printer 63 and the comparator FRXD 32 are minimized by the short periods of comparison afforded by comparison relay 73. If the tongue 74 of the comparator FRXD should be on ground and the tongue 75 of the receiving bid printer should be on negative, current will flow from negative through the non-compare relay 65, through the comparison relay 73 to ground and operate the non-compare relay. This would unlock every relay in the tree-chain and, of course, open the series circuit 76 and prevent any bail pulse through wiper 4 to the release relay 59. The rotary switch stepping magnet eventually homes on the first point and stops. Condenser 77 of the 5th level arrives at the home point with a zero charge and kicks the non-compare relay 65 and resets it for the subsequent comparison.

Figure 6:
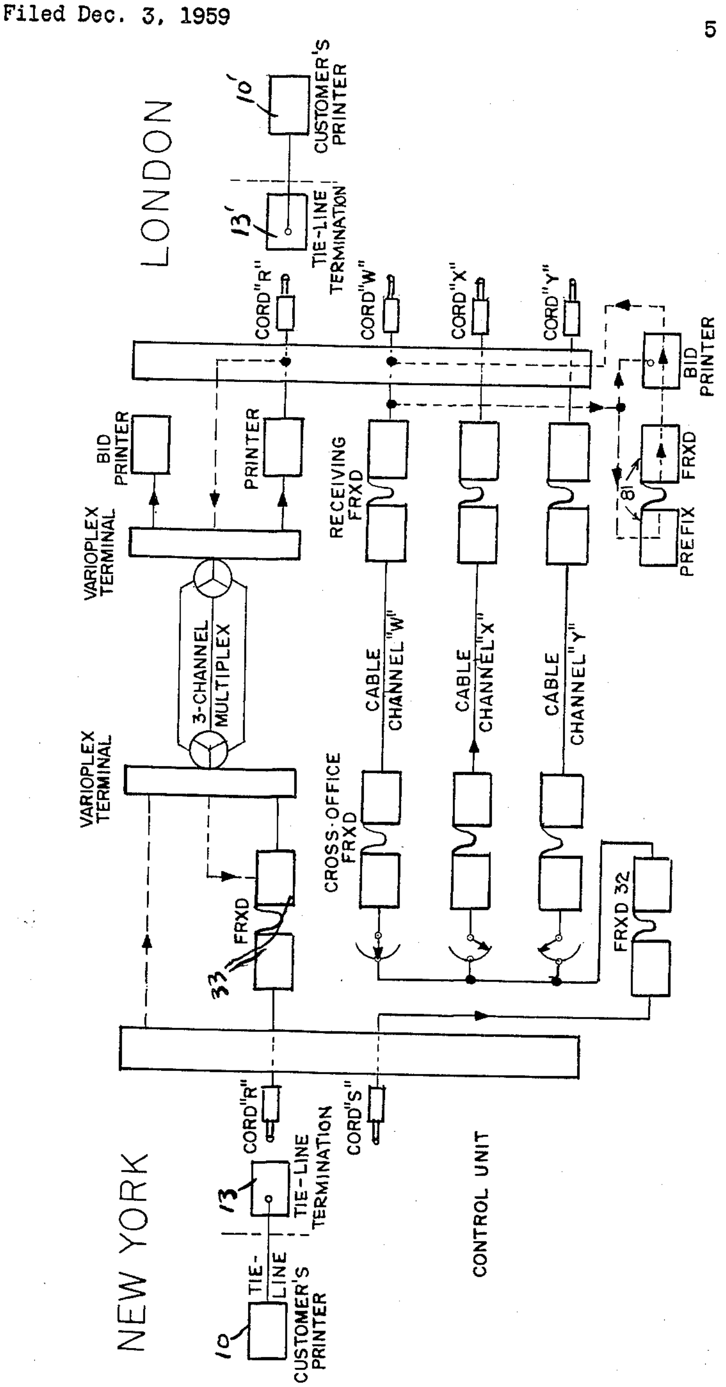
FIG. 6 is a block diagram of a modified system including the switching means of FIGS. 1–3 and additional features.

*Modification of FIG. 6*

By very simple modifications the transmitter of FRXD 32 could be put to a point of a rotary switch or on common points of a group of rotary switches, as shown in FIG. 6, connecting to storage units, and after the message termination made to send directly on a trunk or into cross-office storing equipment that would later transmit to the trunk. Such a switching system for mechanical storage is described in Holcomb U.S. Patent Nos. 2,343,-297 and 2,275,436 but the same switching principles can be used for tape, magnetic, capacity, or other kinds of storage.

It is a feature of the present invention to switch the distant receiving end of such channels in the following simpler, preferred manner:

At the receiving end, messages are stored one after another as they arrive on the trunks, and the operator receives his switching instructions from his receiving bid printer. For example let us assume that three channels W, X, and Y bring in the traffic, and that the cords for these channels are plugged to the tie-lines. If a disconnect signal should pass the pins of transmitter W for example, a red light would go on by the W cord and the operator would unplug it. With the cord still in hand he would see the address of the next message on that cord appear on his bid printer, and would replug accordingly. In similar manner knock downs on cords X and Y would bring up lights, exhibit switching information and be replugged. When a cord has cleared itself of traffic it would be plugged into a special waiting jack until it becomes active again. All of this involves only a simple modification of the set shown in FIGS. 1–3. A condenser associated with an added contact of the W channel disconnect relay 41 operates and locks up a W chain relay when the disconnect relay falls back after an unplug. This chain relay diverts the transmitter output into bid printer 30 and into the coils of an added intermediate reperforator FRXD. The diversion continues for a more or less uniform period and then ceases.

With the switching order plainly exhibited on the printer, the operator then puts the W plug into the designated jack. The regular receiving prefix first runs to the customer and this is followed by transmission from the prefix FRXD transmitter, introduced at point X80 of the FIG. 1 set, and when tight tape between the prefix reperforator and its transmitter opens a contact, a common locking circuit for the chain is broken, and transmission then follows into the W plug directly from the transmitter of the W channel FRXD. When the diverted portion of the prefix was being sent out from the transmitter of the prefix FRXD 81 that transmitter was stepped by a pulse originating in the character generator distributor, and each character sent to the W channel was counted on a rotary switch. At points on the switch corresponding to the passage of the punched tape combination MAMA, relays bring down the call letters from the ring and sleeve of the jack and compare them with the letters being transmitted at that moment. These signal groups can be perfectly phased with each other by adjusting a local pulse segment on the character generator distributor. In the event of a mismatch, transmission would be automatically halted, and the matter investigated. The call is compared twice, so the check will detect line errors as well as incorrect switching operations. When traffic completely clears on a cord, it is plugged into its own idle jack, whence it is removed when new traffic appears. It will then yield suitable information for plugging. The idle jack like the disconnect relay, has a contact with a condenser which is discharged into the proper chain relay when unplugged. It will be apparent that this system is simple, safe and rapid.

What is claimed is:

1. A printing telegraph system comprising a plurality of printers, switching means for interconnecting said printers for communication, means associated with the printer at the originating point for initiating a call by sending a control code signal, a channel connecting the calling and terminating points of the system, means responsive to the initiation of a call for transmitting a checking code signal back from the terminating point over said channel and means including a code storage device common to a plurality of printers for controlling the message transmission from said first-mentioned printer by the relation between said control and checking codes, to prevent transmission in the case of switching errors.

2. A printing telegraph system as set forth in claim 1, in which a tie-line concentrator is provided to connect operating printers to said connecting channel.

3. A printing telegraph system comprising a transmission channel, a plurality of printers arranged in pairs, means for effecting exclusive transmission only between the two printers of each pair over said channel, said means including switching means for interconnecting each pair over said channel when one of the printers of a pair initiates a call and for dividing the transmission facilities of said channel among the operating printers, and means for preventing transmission from said one printer after it initiates a call unless and until the desired connection is made without error to the other printer of the pair.

4. A communication system comprising a plurality of paired transmitters and receivers, each of said transmitters having a single exclusive receiver, a multichannel system shared by the transmitters and receivers that are operating at any time, selective switching means for connecting said transmitters and receivers to said multichannel system and means for controlling said selective switching means in response to an individual transmitter code signal and also to a revertive code signal from the receiving end of the system.

5. A communication system of the type having keyboard printers at the originating office, receiving printers at the final office, transmitting channels or trunks connecting said offices and switching means for connecting operating printers to said channels or trunks, said system comprising means responsive to the operation of the switching means at the originating office for sending a selection code signal to the final office and for sending a revertive checking code signal to the originating office indicating the receiving printer selected, and code responsive electrical means for comparing said code signals to determine the accuracy of the switching operation.

6. A communication system as set forth in claim 5, in which the code signal-comparing means controls the transmission of the message from a printer originating a call.

7. A communication system as set forth in claim 5, in which a character generator common to switching means for a plurality of printers generates different code signals depending upon the particular printer initiating a call.

8. A communication system comprising a transmission channel, a plurality of sending units, switching means for connecting said units to said channel for communication, said switching means having contacts, and means connected to said contacts for automatically sending a code signal over said channel of distinctive character and identifying any sending unit as it is connected to said channel.

9. A communication system comprising a transmission channel, a plurality of sending units, switchboard means including manual cords and jacks for connecting units to said channel for transmission and means connected to contacts of said jacks for interpolating identifying codes of different character for each sending unit when connection is made through the switchboard.

10. A communication system comprising originating and final offices having lines to sending and receiving units, means at the originating office for designating a wanted receiving unit, means for connecting calling units to wanted receiving units, means responsive to the selection of a receiving unit line for comparing the designation thereof with the calling designation at the originating office, electrically operated means for controlling transmission between the connected units, and means whereby said last-mentioned means is responsive to the matching of calling and selected line designations.

11. A communication system comprising a plurality of sending units, each having a distinctive code designation, a transmission channel, switching means for individually connecting said sending units to said channel for operation from time to time, means for interposing a switching code-verifying step before the connecting step, and a common program switch associated with said switching means including contact means for programming the steps of each call.

References Cited in the file of this patent

UNITED STATES PATENTS

| | | |
|---|---|---|
| 1,936,200 | Locke et al. | Nov. 21, 1933 |
| 2,121,163 | Robinson | June 21, 1938 |
| 2,153,574 | Kleinschmidt | Apr. 11, 1939 |
| 2,213,560 | Bryce | Sept. 3, 1940 |